Figure 1:
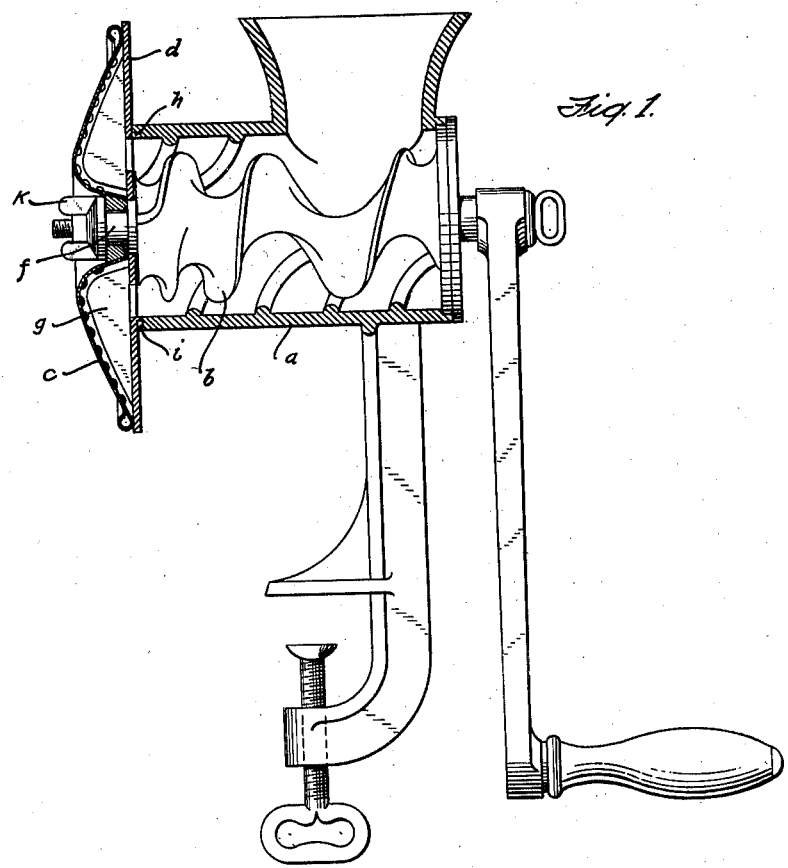

Sept. 3, 1935.　　　　G. SATZINGER　　　　2,013,009
MACHINE FOR COMMINUTING FOODSTUFFS
Filed Jan. 10, 1935　　　2 Sheets-Sheet 1

INVENTOR
GEBHARD SATZINGER
BY
ATTORNEY

Sept. 3, 1935.    G. SATZINGER    2,013,009
MACHINE FOR COMMINUTING FOODSTUFFS
Filed Jan. 10, 1935    2 Sheets-Sheet 2
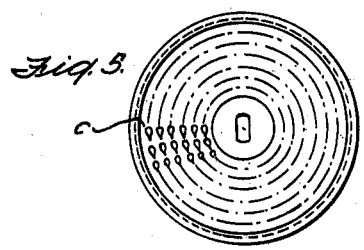
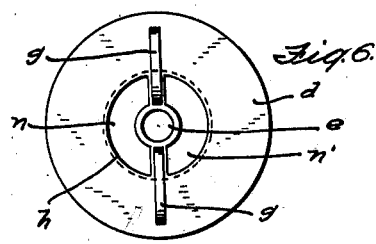
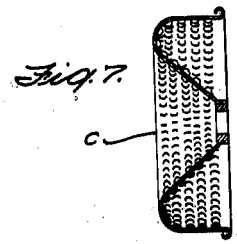
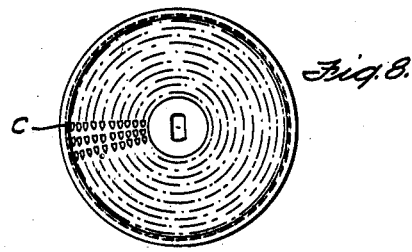
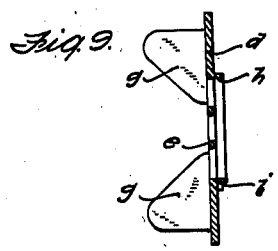
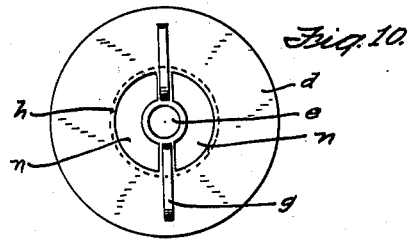
INVENTOR
GEBHARD SATZINGER
BY
his ATTORNEY Patented Sept. 3, 1935

2,013,009

UNITED STATES PATENT OFFICE 2,013,009

MACHINE FOR COMMINUTING FOODSTUFFS

Gebhard Satzinger, Bad Kissingen, Germany

Application January 10, 1935, Serial No. 1,180
In Germany December 17, 1934

3 Claims. (Cl. 146—186)

My invention relates to meat choppers or meat cutters, and similar devices, used in households, restaurants, or the like, for the comminution of food-stuffs, such as raw meat, raw vegetables etc. and more especially to devices of this kind in which the comminution is effected by means of a helical cutting member which is rotatably mounted in a tubular or cylindrical casing, wherein the material is subjected to the continuous action of the cutting edges of the helical cutter which at the same time advances the material toward the discharge end of the tubular casing. At the discharge end, such devices are usually provided with a perforated disk, or two relatively movable perforated disks, that is to say, a stationary disk, which is secured to the end of the tubular casing and which is provided with a bearing for the rotatable cutter, and a rotatable disk which is carried by the helical cutting member so as to rotate therewith in close proximity to the said stationary disk, whereby a further comminution of the material is effected prior to its discharge from the device.

The object of the present invention is to improve such devices with a view to enabling them to be used also as graters while at the same time greatly enlarging the effective comminuting area thus considerably increasing the efficiency of such devices, without otherwise changing their construction. My invention, therefore, more specifically comprises a grating attachment adapted to be used in connection with existing devices of the type referred to and so designed as to be readily mounted on such devices and dismounted therefrom.

The grating attachment which is preferably mounted on the end of the above mentioned tubular casing in the place of the above mentioned perforated disk, has a much larger diameter than said perforated disk. In cases where the stationary perforated disk is not detachable, but is made integral with the tubular casing, the grating member may be attached to such perforated disk. Where, however, both the stationary and the rotatable perforated disks can be removed, a disk corresponding in size to the diameter of the grating member is mounted on or secured in position to the end of the tubular casing, being provided with a bearing for the helical cutter. Outside of this bearing, said disk has large apertures for the passage therethrough of the material. Moreover, said disk is provided with outwardly projecting wing-portions adapted to hold the material in place so as to be effectively acted upon by the disk-shaped grating member, which is disposed in close juxtaposition thereto, being secured to the rotatable helical cutting member so as to continually rotate therewith. In the case of devices equipped with a non-detachable stationary perforated disk, the disk cooperating with the grating member may be mounted directly adjacent to the said stationary disk so that the apertures in the disk of the grating attachment coincide with the perforations in said stationary disk. Any suitable means may be used for securing the disk of the grating attachment in position on the tubular casing of the comminuting device.

Figure 2:
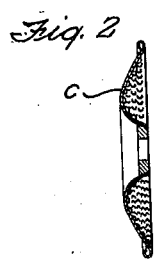
Figures 3, 4:
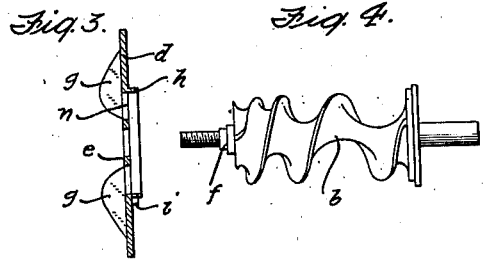

On the appended drawings, on which, by way of illustration, I have shown various embodiments of my new grating attachment, Fig. 1 shows a comminuting machine of the meat-chopper type being equipped with the new grating attachment, which, together with the tubular casing of the machine, is shown in section; Fig. 2 is a view of the detached grating member; Fig. 3 is a sectional view of the cooperating disk; Fig. 4 shows the helical cutting member; Fig. 5 is an inside view of a modified grating member; Fig. 6 is a full view of the cooperating disk when viewed from the left in Fig. 1; Fig. 7 is a side elevation of another modified grating member; Fig. 8 is an inside view thereof; Fig. 9 is a sectional view of the cooperating disk, while Fig. 10 is a full view thereof as seen from the left in Fig. 9.

In Fig. 1 my new grating attachment is shown in place on a comminuting machine of the meat chopper type. In said figure, there is shown at $a$ the tubular casing, while $b$ denotes the rotatable helical cutting member. At $d$ is shown the disk of the grating attachment which disk, as is clearly shown in Fig. 1, is of large diameter and in its center is formed with a bearing $e$ for the journal of the helical cutting member $b$. Outside of said bearing the disk $d$ has two large apertures shown at $n$, $n'$ in Fig. 6. Moreover, the disk $d$ has outwardly projecting wing-portions $g$. At $h$ is shown on the disk an annular flange adapted to be received in a corresponding groove at the free end of the tubular casing $a$. At $i$ is shown a pin which, as the said disk $d$ is mounted in place, enters a notch provided in the tubular casing $a$ whereby the disk $d$ is held against rotation on said casing. At $c$ is shown the dish-shaped grating member having dimensions corresponding to the size of the disk $d$. This grating member is placed with its center on a square $f$ formed at the end of the helical cutter $b$, being firmly secured thereto by a wing-nut shown at $k$ in Fig. 1. The dish-shaped grating member $c$, together with the disk $d$, forms a hollow space which by the wing-shaped portions *g* provided on the said disk is subdivided into separate compartments, the said wing-shaped portions *g* extending into close proximity to the said grating member *c* which by the wing-nut *k* is so secured that its periphery bears directly onto the disk *d*. By the wing-shaped portions *g* formed on the disk *d*, the material to be comminuted is held in place so as to be very effectively acted upon by the rotating grating member *c*. The material having first been comminuted by the helical cutter *b* while the same is being rotated in the tubular casing *a*, is at the same time moved along by the convolutions of said cutter in a direction toward the disk *d*, that is to say, toward the left in Fig. 1. The comminuted material then passes through the apertures *n* in the disk *d* into the hollow space formed by said disk and the dish-shaped grating member *c*, which space, by the said wing-shaped portions *g* is subdivided into separate compartments, in which the material is held while being further acted on by the grating member *c*.

Other modifications of the grating member *c* and its cooperating disk *d* are shown in Figs. 7–10. In this grating member the grating surface extends in various directions, grating teeth being formed also along the periphery of the grating member.

If desired, a protecting hood may be used covering the larger portion of the grating member.

While I have shown and described various embodiments of my invention, my invention is, of course, not limited thereto, because obviously changes may be made without a departure from the nature of the present invention.

I claim:

1. In a machine of the type described, in combination with the casing of the machine and a rotatable comminuting member enclosed in said casing, a grating attachment comprising an apertured disk of large diameter adapted to be secured to said casing at the discharge end thereof and provided with outwardly projecting wing-portions, a substantially dish-shaped grating member adapted to bear against said disk forming a hollow space with said disk divided by said wing-portions into separate compartments, and means for securing said grating member to said rotatable comminuting member thereby causing rotation of said grating member relative to said disk.

2. In a machine of the type described, in combination with the casing of the machine and a rotatable comminuting member enclosed in said casing, an apertured disk of large diameter adapted to be secured to said casing at the discharge end thereof, being provided with outwardly projecting wing-portions and a bearing for the axis of said rotatable comminuting member, a substantially dish-shaped grating member adapted to bear against said disk along the periphery thereof in close proximity to the wing-portions on said disk forming therewith a hollow space divided by said wing-portions into separate compartments, said grating member having a hub to fit the axis of said comminuting member, and detachable means for securing said hub to said axis.

3. In a machine of the type described, in combination with the casing of the machine and a rotatable comminuting member enclosed in said casing, an apertured round disk of large diameter adapted to be secured to said casing at the discharge end thereof and provided with oppositely disposed wing-portions projecting outwardly from said disk, the latter being also formed with a bearing for the axis of said comminuting member, a hollow grating member having grating teeth along its circumference and designed to receive the opposite wing-shaped portions of said disk, the grating teeth being in close proximity thereto, said grating member also being formed with a hub to fit the axis of said comminuting member, and a detachable means for securing the hub of said grating member to said axis in cooperative relation to said disk and its wing-shaped portions.

GEBHARD SATZINGER.